(12) United States Patent
Tarrant et al.

(10) Patent No.: US 9,909,645 B2
(45) Date of Patent: Mar. 6, 2018

(54) FLYWHEELS FOR ENERGY STORAGE AND METHODS OF MANUFACTURE THEREOF

(71) Applicant: GKN Hybrid Power Limited, Worcestershire (GB)

(72) Inventors: Colin David Tarrant, Cheshire (GB); Mark Bailey, Norfolk (GB); Colin Leslie Martin, Oxfordshire (GB); Brian Patrick O'Rourke, Oxfordshire (GB)

(73) Assignee: GKN Hybrid Power Limited, Worcestershire (GB)

( * ) Notice: Subject to any disclaimer, the term of this patent is extended or adjusted under 35 U.S.C. 154(b) by 137 days.

(21) Appl. No.: 14/905,976

(22) PCT Filed: Jul. 18, 2014

(86) PCT No.: PCT/GB2014/052206
§ 371 (c)(1),
(2) Date: Jan. 19, 2016

(87) PCT Pub. No.: WO2015/008089
PCT Pub. Date: Jan. 22, 2015

(65) Prior Publication Data
US 2016/0153523 A1      Jun. 2, 2016

(30) Foreign Application Priority Data

Jul. 19, 2013   (GB) .................................. 1312932.5

(51) Int. Cl.
*F16F 15/30*    (2006.01)
*F16F 15/305*   (2006.01)
*F16F 15/315*   (2006.01)

(52) U.S. Cl.
CPC ........ *F16F 15/305* (2013.01); *F16F 15/3153* (2013.01); *Y02E 60/16* (2013.01)

(58) Field of Classification Search
CPC ...... F16F 15/30; F16F 15/305; F16F 15/3153; F16F 15/00; Y02E 60/16; H02K 7/02
See application file for complete search history.

(56) References Cited

U.S. PATENT DOCUMENTS 3,788,162 A * 1/1974 Rabenhorst ............. F16F 15/30
                                                       156/177
4,207,778 A    6/1980 Hatch
(Continued)

FOREIGN PATENT DOCUMENTS

EP    0145182 A1    6/1985
EP    1077335 A1    2/2001
(Continued)

OTHER PUBLICATIONS

United Kingdom Intellectual Property Office, Patents Act 1977: Search Report under Section 17, Application No. GB1312932.5, dated Sep. 16, 2013 (2 pages).
(Continued)

*Primary Examiner* — Thomas C Diaz
(74) *Attorney, Agent, or Firm* — Wood Herron & Evans LLP

(57) ABSTRACT

A flywheel used for kinetic energy storage and the construction of the flywheel using composite materials. The present invention provides a rotor support for coupling an annular flywheel rotor to a shaft for rotation with the shaft, the support comprising a body having a longitudinal axis about which it rotates in the finished flywheel assembly, wherein the body comprises a stack of sheets of a composite material including fibers, the stack includes at least two unidirectional sheets, each having substantially all of their fibers extending in the same direction, and the fibers of one of the unidirectional sheets are orientated at a different angle to the longitudinal axis of the body to the fibers in another unidirectional sheet. The body includes at least one side layer of (Continued)

woven fabric provided over a side of the stack of sheets. The rotor support configuration of the present invention provides a stiff construction.

22 Claims, 3 Drawing Sheets

(56) References Cited

U.S. PATENT DOCUMENTS

| | | | |
|---|---|---|---|
| 4,266,442 | A | 5/1981 | Zorzi |
| 4,341,001 | A | 7/1982 | Swartout |
| 5,562,014 | A | 10/1996 | Waagepetersen |
| 5,628,232 | A | 5/1997 | Bakholdin et al. |
| 5,816,114 | A | 10/1998 | Gregoire et al. |
| 5,871,117 | A | 2/1999 | Protasov et al. |
| 5,946,979 | A | 9/1999 | Waagepetersen |
| 6,122,993 | A | 9/2000 | Morris et al. |
| 6,508,145 | B1 | 1/2003 | Gabrys |
| 9,267,570 | B2 | 2/2016 | Spears et al. |
| 9,279,474 | B2 | 3/2016 | Tarrant |
| 2010/0018344 | A1 | 1/2010 | Spears et al. |
| 2010/0206126 | A1 | 8/2010 | Spears et al. |
| 2014/0265674 | A1 | 9/2014 | Kalev et al. |
| 2016/0153523 | A1 | 6/2016 | Tarrant et al. |
| 2017/0012489 | A1 | 1/2017 | Townend |

FOREIGN PATENT DOCUMENTS

| | | |
|---|---|---|
| EP | 1199493 A2 | 4/2002 |
| GB | 2462671 A | 2/2010 |
| GB | 2469657 A | 10/2010 |
| WO | 9324765 A1 | 12/1993 |
| WO | 9615391 A1 | 5/1996 |
| WO | 9747898 A1 | 12/1997 |
| WO | 9809095 A2 | 3/1998 |
| WO | 2010020806 A1 | 2/2010 |

OTHER PUBLICATIONS

United Kingdom Intellectual Property Office, Patents Act 1977: Search Report under Section 17, Application No. GB1312927.5, dated Sep. 12, 2013 (1 page).

European Patent Office, International Search Report and Written Opinion of the International Searching Authority, International Application No. PCT/GB2014/052204, dated Oct. 2, 2014 (13 pages).

European Patent Office, International Search Report and Written Opinion of the International Searching Authority, International Application No. PCT/GB2014/052206, dated Oct. 2, 2014 (11 pages).

* cited by examiner

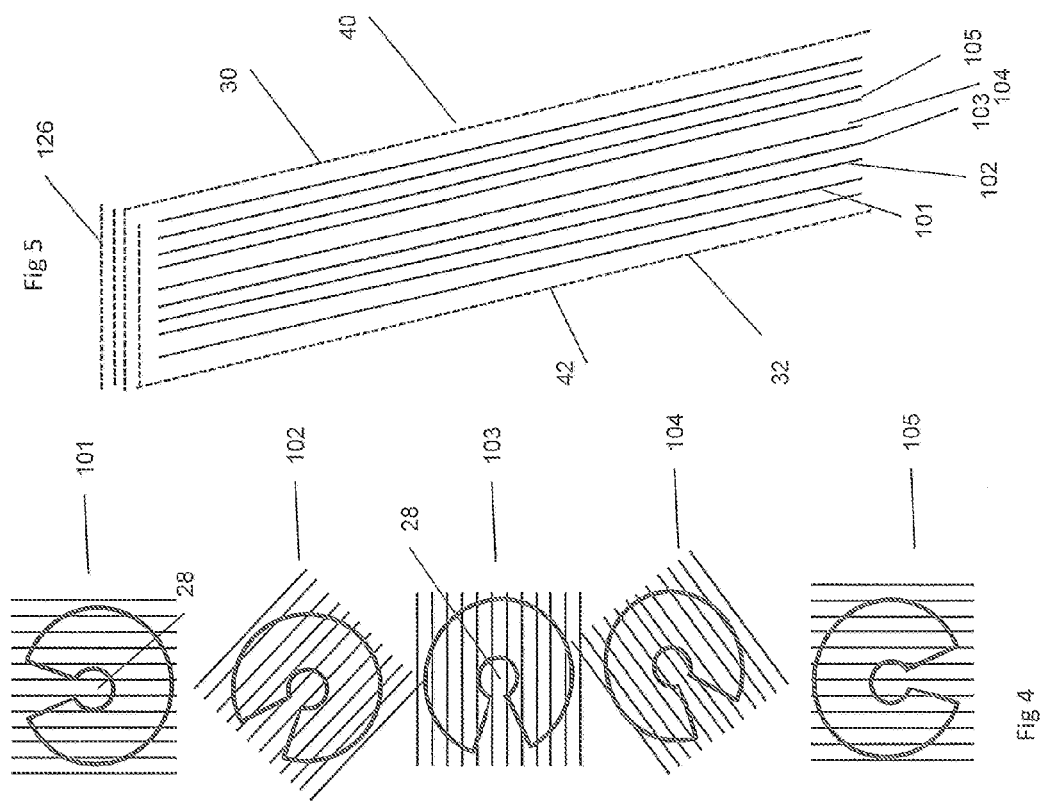
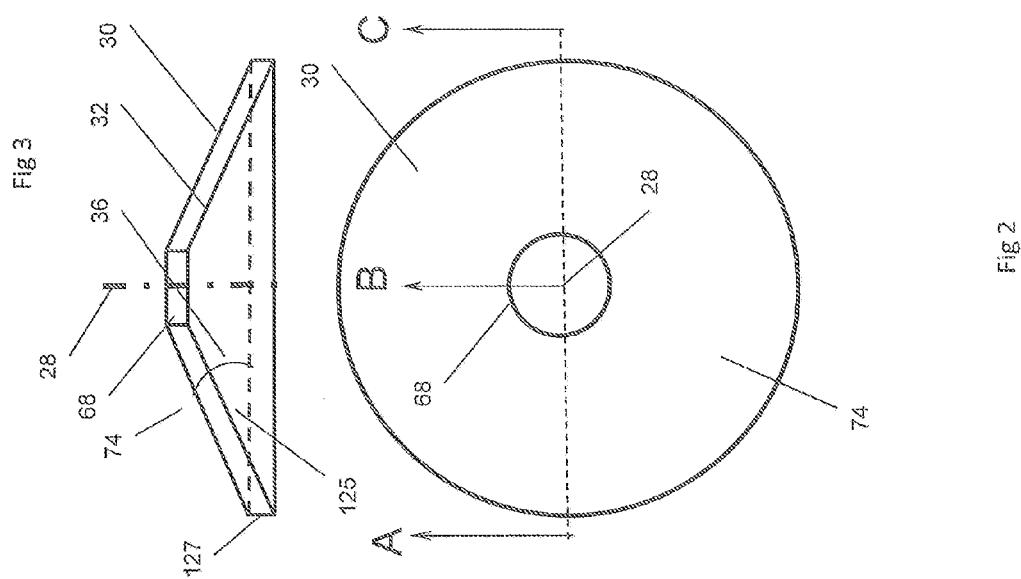

FLYWHEELS FOR ENERGY STORAGE AND METHODS OF MANUFACTURE THEREOF

CROSS-REFERENCE TO RELATED APPLICATIONS

This application is a submission under 35 U.S.C. § 371 of International Application No. PCT/GB2014/052206, filed Jul. 18, 2014, which claims priority to Great Britain Application No. 1312932.5, filed Jul. 19, 2013, the disclosures of which are hereby expressly incorporated by reference herein in their entireties.

FIELD OF THE INVENTION

The present invention relates to flywheels used for kinetic energy storage and more particularly to the construction of flywheel assemblies using composite materials.

BACKGROUND OF THE INVENTION

It is well known to use flywheels to store mechanical kinetic energy. The amount of energy stored depends on the mass of the flywheel and its speed of rotation. The kinetic energy of the flywheel is proportional to the square of its angular velocity. However, the amount of energy that may be stored in a given flywheel is dependent upon the robustness of the flywheel assembly and how it responds to the stresses experienced at high rotational speeds.

It is preferable to form flywheel assemblies from materials which are of low density and high specific strength. The materials also need to be extremely strong. For use in, for example, hybrid vehicles or uninterruptable power supplies, energy storage flywheel assemblies need to operate at extremely high speeds, greater than 10,000 rev./min or even more than 50,000 or 100,000 rev./min. Accordingly, there is considerable demand for flywheel assemblies that are able to operate reliably at speeds of these orders.

WO2010/020806 (filed by the present applicant) discloses a flywheel assembly in which the rotor is connected to a composite end cap. The end cap is mounted on a shaft.

SUMMARY OF THE INVENTION

The present invention provides a rotor support for coupling an annular flywheel rotor to a shaft for rotation with the shaft, the support comprising a body having a longitudinal axis about which it rotates in the finished flywheel assembly,
wherein the body comprises a stack of sheets of a composite material including fibres,
the stack includes at least two unidirectional sheets, each having substantially all of their fibres extending in the same direction,
the fibres of one of the unidirectional sheets are orientated at a different angle to the longitudinal axis of the body to the fibres in another unidirectional sheet, and
the body includes at least one side layer of woven fabric provided over a side of the stack of sheets.

The or each side layer may extend from a side face of the stack of sheets at least partway over an outer circumferential edge surface of the stack to resist delamination of the stack.

At least one peripheral layer of woven fabric may be provided which extends over the outer circumferential edge surface of the stack of sheets. This can be included for sacrificial purposes and shaped as the support is machined to the desired size. The at least one peripheral layer may overlap the at least one side layer.

The woven fabric and/or the sheets may comprise at least one of carbon fibres, E-glass fibres, S-glass fibres, basalt rock fibres and boron nitride fibres.

The rotor support configuration of the present invention provides a stiff construction. Preferably, it is sufficiently stiff to ensure that its resonant frequencies of vibration are greater than the rotational frequencies encountered during its operation. Also flywheels used in vehicles need to withstand the gyroscopic and other forces associated with the motion of the vehicle.

Preferably, the angle between the fibres of the one unidirectional sheet and the fibres of the other unidirectional sheet is around 45°. Orientating a plurality of sheets relative to each other in this way seeks to equalise the physical properties of the support around its axis. An angle of around 45° has been determined to be relatively straightforward to achieve in manufacture whilst giving sufficiently quasi-isotropic properties to the rotor support in the plane of its body (that is, sufficiently uniform properties in all directions in the plane of the fibres). This uniformity is desirable to provide uniform deflection of the support around its circumference when it is rotated at speed. It may be achievable with other arrangements, but they may be far more complex to assemble.

The fibres of each sheet may be orientated at a different angle to the longitudinal axis of the body to the fibres in an adjacent sheet.

In preferred embodiments, all of the sheets in the stack are unidirectional sheets of carbon fibre. They may be pre-impregnated with a suitable matrix material. This support configuration uses unidirectional composite sheets as they are much stronger than woven fibre material.

The support may include a mid-layer of composite material between two adjacent sheets. For example, the mid-layer may comprise non-aligned lengths of fibres in a matrix material. This may allow the cost of the support to be reduced further, by reducing the number of sheets required and instead using a lower cost composite filler material.

The body of the support may define a substantially frusto-conical inwardly facing surface which is coaxial with the longitudinal axis of the body. Preferably, the inwardly facing surface defines an angle with respect to a plane perpendicular to the longitudinal axis of the support which is in the range 17 to 26°.

The present invention also provides a flywheel assembly including a support as defined herein. A rotor may be mounted on the support, with the frusto-conical inwardly facing surface of the support defining an angle with respect to the longitudinal axis of the body which is selected such that the support is strain matched with the rotor. In this way, the rotor and support are arranged to deform in the same way when the assembly is rotated, avoiding separation of the two components.

The present invention further provides a method of manufacturing a rotor support for coupling an annular flywheel rotor to a shaft for rotation with the shaft, the support comprising a body having a longitudinal axis about which it rotates in the finished flywheel assembly, comprising the steps of:
forming a stack of sheets of a composite material including fibres, the stack including at least two unidirectional sheets, each having substantially all of their fibres extending in the same direction, overlaying the sheets such that the fibres of one of the unidirectional sheets are orientated at a different angle to the longitudinal axis of the body to the fibres in another unidirectional sheet, and applying at least one side layer of woven fabric over a side of the stack of sheets.

The method may include mounting the rotor support on a shaft, and machining the outer circumferential surface of the support to a predetermined profile whilst rotating the shaft.

BRIEF DESCRIPTION OF THE DRAWINGS

Embodiments of the present invention will now be described by way of example and with reference to the accompanying schematic drawings, wherein:

FIG. 2 is a plan view of the rotor support shown in FIG. 1;

FIG. 3 is a cross-sectional side view of the rotor support shown in FIG. 2 along line A-C;

FIG. 4 illustrates a series of carbon fibre sheets for use in fabrication of a rotor support embodying the present invention;

FIG. 5 is a cross-sectional view of the rotor support shown in FIG. 2 along line A-B.

DETAILED DESCRIPTION OF THE INVENTION

Figure 1:
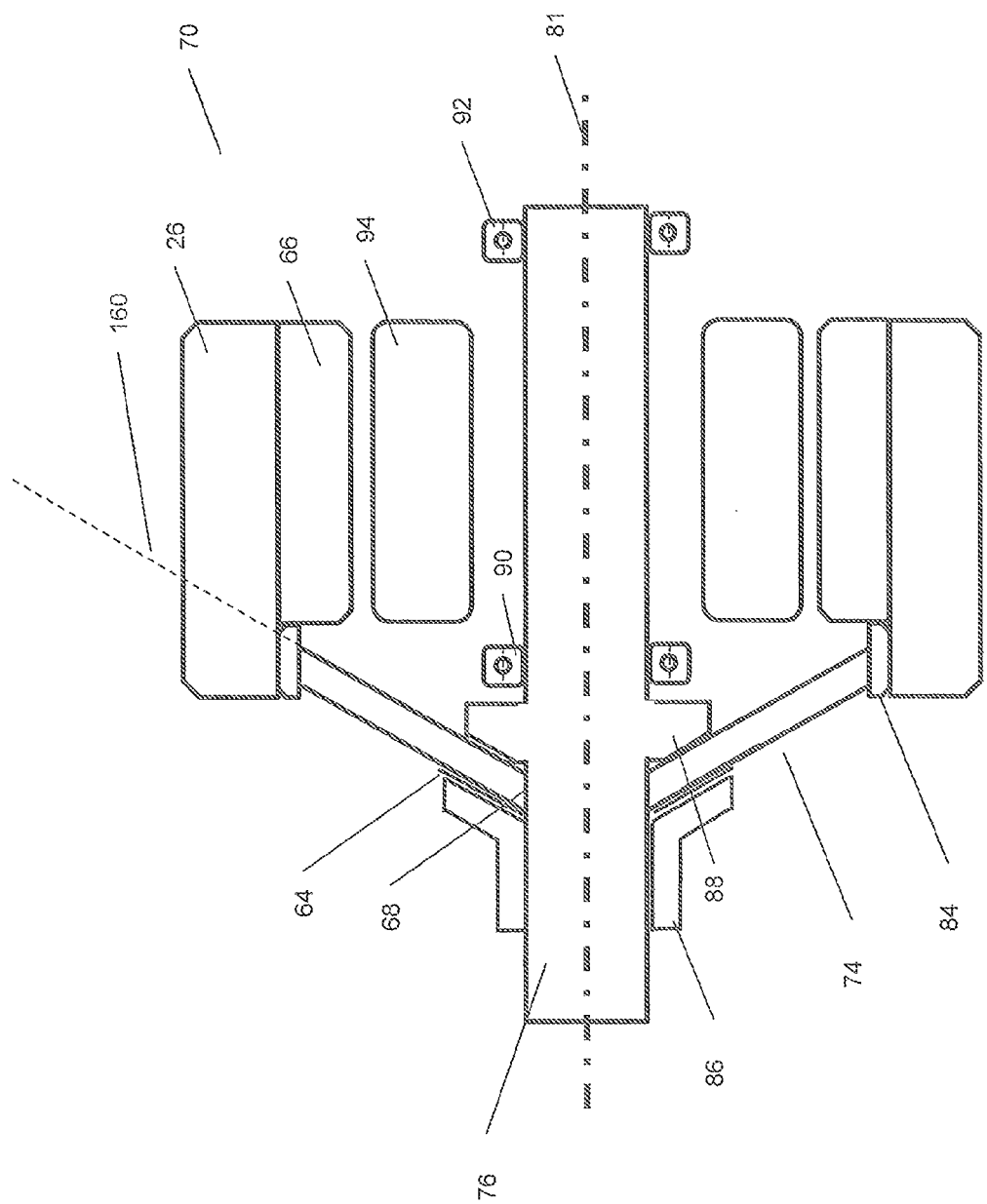
FIG. 1 is a cross-sectional side view of a flywheel assembly including a rotor support embodying the present invention.

FIG. 1 illustrates a flywheel assembly 70 including a rotor support 74 according to an embodiment of the present invention. The assembly includes a rotor assembly having an annular outer rotor portion 26 and an inner annular rotor portion or annulus 66. The outer rotor 26 is formed of a composite material comprising unidirectional filaments of carbon fibres in a matrix of a resin material. The inner annulus 66 is formed of unidirectional filaments of glass fibre in a matrix formed of a mixture of resin and magnetic particles.

The rotor assembly is carried by the rotor support 74 which is in the form of a hub or end cap. The end cap is a laminar body defining two generally conical surfaces joined by cylindrical surfaces at its inner and outer edges. A ring 84 is provided between the end cap and rotor assembly. The outer circumference of the rotor support carries the ring 84 and the outer rotor is in turn mounted on the ring. The rotor support has a central circular opening 68.

A central shaft 76 extends through the opening 68 in the rotor support 74. The shaft includes a circumferentially extending flange 88. The rotor support is retained against the flange 88 by a clamping nut 86 which is threaded onto the shaft 76. An anti-fretting shim 64 is provided between the nut 86 and the end cap 74. The shaft is supported for rotation about a longitudinal axis 81 of the flywheel assembly by bearings 90 and 92. The bearings are in turn supported by a containment (not shown) for the flywheel assembly. The rotor assembly is rotatable about an electrical motor generator stator 94 carried by the containment.

A flywheel to be used to store energy in a vehicle may have an outer diameter of around 350 mm with the inner diameter of the outer rotor being around 290 mm and the inner diameter of the inner annulus around 250 mm, for example.

The fabrication of the rotor support shown in FIG. 1 will now be described with reference to FIGS. 2 to 5.

FIG. 2 shows the rotor support 74 in plan view, whilst a cross-sectional side view along the line A-C marked in FIG. 2 is shown in FIG. 3. The rotor support is rotationally symmetrical about a longitudinal axis 28. It is frusto-conical, with the axis of the conical shape coinciding with longitudinal axis 28. The body of the support has a substantially constant cross-sectional thickness. Its outer periphery defines a substantially cylindrical surface 127, which is also centred on axis 28. Between the central opening 68 and the perimeter 127, the body defines an outwardly facing frusto-conical surface 30 and an inwardly frusto-conical surface 32.

The body comprises multiple layers of carbon fibre material. As illustrated in FIG. 4, each C-shaped layer is cut from a sheet of unidirectional carbon fibre material. A number of such sheets 101 to 105 are shown in FIG. 4 prior to incorporation into the finished rotor support illustrated in FIG. 5. In practice, 50 layers may be included, for example. The layers are C-shaped so that they form the desired conical shape when placed into a mould during fabrication of the end cap.

As shown in FIG. 4, each sheet is orientated at a different angle with respect to the central axis 28 of the support. In the examples shown, each layer is rotated through 45° relative to the previous layer. The number of layers incorporated in the rotor support is selected to provide the required axial stiffness and strength.

The conical body 74 defines an angle 36 with respect to a plane perpendicular to its longitudinal axis 28. This angle may be in the range 17-26°, for example, and more preferably an angle of around 20°. This angle is selected such that the support is strain matched with the rotor to be mounted on it, to ensure the integrity of the rotor assembly during its rotation at high speed.

The outer faces of the top and bottom sheets in the body of the rotor support are covered with respective layers 40, 42 of a woven carbon fabric. These layers extend beyond the outer edges of some or all of the sheets. The portions which extend beyond the sheets are folded to extend over the outer edges of some or all of the sheets. The sheet 42 on the inner face of the body is overlapped around the perimeter of the body by the outer layer 40. A woven carbon material is used as it is sufficiently flexible whilst able to resist high stresses.

One or more additional layers 126 of woven carbon cloth are applied over layers 40, 42 around the perimeter of the rotor support.

The layers 40,42 of carbon fabric are provided to strengthen the rotor support. In particular, as they are wrapped around the perimeter of the support, they serve to resist delamination of the sheets (101 and so on).

The additional circumferential layers 126 of woven carbon fabric are primarily provided for sacrificial purposes, to allow the end cap to be accurately machined to the desired diameter without weakening the support by damaging the layers 40,42 or the sheets within them. For example, the rotor support may be intended to be an interference fit with the surrounding structure in the rotor assembly, such as the ring 84 shown in FIG. 1. Accordingly, machining of its circumference is required to provide the necessary precision in its shape.

The unidirectional carbon fibre sheets are preferably manufactured from T700 or T800 fibre or an equivalent at a fibre volume fraction of around 58%. The resin used in these sheets is a toughened epoxy with a suitable Tg (operating temperature characteristic) for the environment the flywheel will be operating in (for example, below 100° C.). An alternative is to use a thermoplastic matrix material such as PEEK, PET or the like, again taking in to account the operating temperatures expected.

The woven carbon fibre fabric may be manufactured from the same range of materials as described above in relation to the unidirectional sheets, with the same (or similar) fibre volume fraction and using the same resin system. The weave pattern used can be selected from a range of weaves, such as a five harness satin weave, for example.

The end cap may be manufactured by assembling the plys in a precision closed mould. The assembly is heated up to the temperature at which the resin system in the sheets melts whilst under a pressure of at least five atmospheres. In the case of a thermoset matrix such as epoxy, it is held under these conditions until the epoxy system has cured. It is then cooled and the end cap removed from the mould. Where a thermoplastic matrix is used the assembly is heated up to the melting temperature of the matrix material whilst under pressure to allow the matrix in the layers to mix together forming a consolidated structure and then allowed to cool.

In a further variation, a mid-layer of composite material may be included in the rotor support, between the adjacent sheets in the stack of sheets. This material is selected such that the support is of lower cost, by allowing the number of unidirectional fibre sheets to be reduced, whilst still providing a finished rotor support with sufficient strength and stiffness.

The mid-layer may be formed from a mix of resin material and randomly orientated short fibre filaments. The filaments may be formed of carbon, for example, and 1 to 2 cm or more long.

Figure 6:
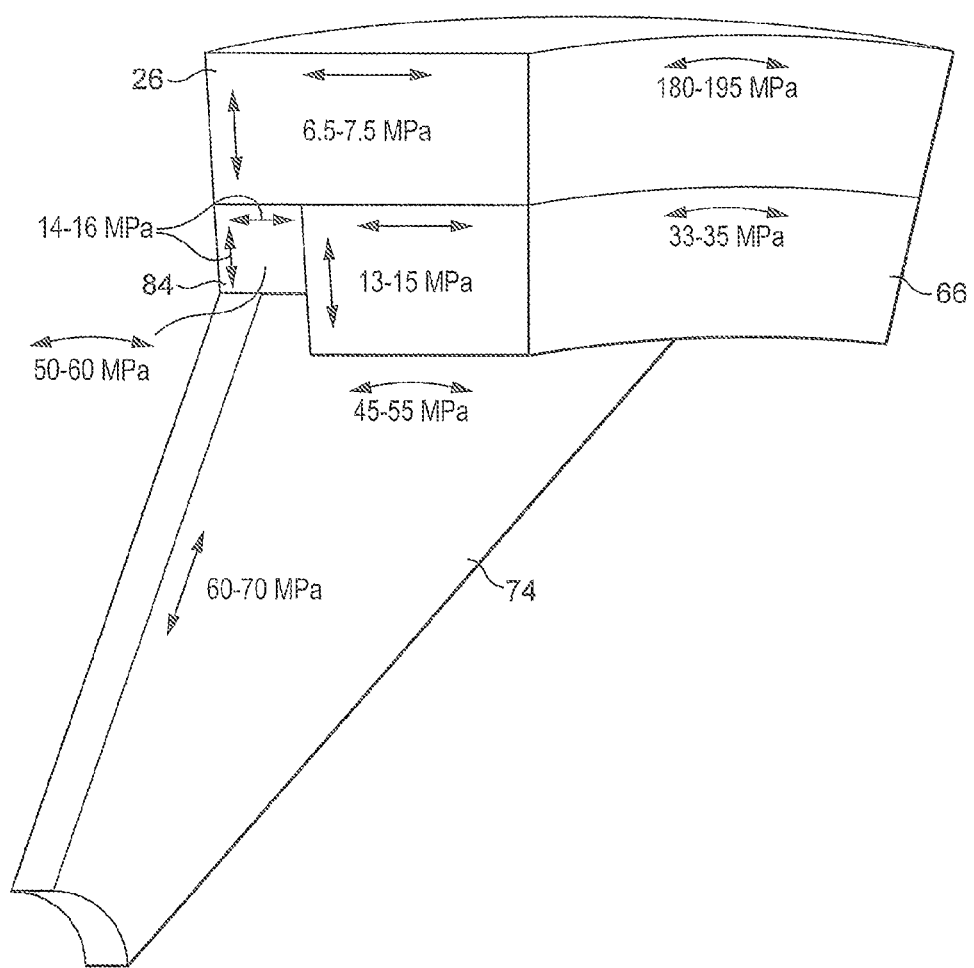
FIG. 6 is a cross-sectional view of part of the flywheel assembly of FIG. 1, with preferred strength values added.

As shown in the embodiment of FIG. 6, the radial tensile strength of the end cap 74 is relatively high, around 60 to 70 MPa. In contrast, the radial (and axial) transverse compressive strength of the ring is low (14 to 16 MPa) and that of the rotor (6.5 to 7.5 MPa) is lower still. The ring is therefore tougher than the rotor in the radial direction, and acts as a load spreading element. The ring prevents the much harder end cap digging into and damaging the relatively soft rotor during assembly. The hoop strength of the end cap (that is, its strength in the circumferential direction) is around 45 to 55 MPa in this embodiment.

While the present invention has been illustrated by description of various embodiments and while those embodiments have been described in considerable detail, it is not the intention of Applicants to restrict or in any way limit the scope of the appended claims to such details. Additional advantages and modifications will readily appear to those skilled in the art. The present invention in its broader aspects is therefore not limited to the specific details and illustrative examples shown and described. Accordingly, departures may be made from such details without departing from the spirit or scope of Applicants' invention.

What is claimed is:

1. A rotor support for coupling an annular flywheel rotor to a shaft for rotation with the shaft, the support comprising a body having a longitudinal axis about which it rotates in the finished flywheel assembly,
    wherein the body comprises a stack of sheets of a composite material including fibres,
    the stack includes at least two unidirectional sheets, each having substantially all of their fibres extending in the same direction,
    the fibres of one of the unidirectional sheets are orientated at a different angle to the longitudinal axis of the body to the fibres in another unidirectional sheet,
    the body includes at least one side layer of woven fabric provided over a side face of the stack of sheets, and
    the at least one side layer extends at least partway over an outer circumferential edge surface of the stack of sheets to resist delamination of the stack.

2. A support of claim 1, wherein the body includes at least one peripheral layer of woven fabric which extends over the outer circumferential surface of the stack of sheets.

3. A support of claim 2, wherein the at least one peripheral layer overlaps the at least one side layer.

4. A support of claim 1, wherein the woven fabric comprises at least one of carbon fibres, E-glass fibres, S-glass fibres, basalt rock fibres and boron nitride fibres.

5. A support of claim 1, wherein the angle between the fibres of the one unidirectional sheet and the fibres of the other unidirectional sheet is around 45°.

6. A support of claim 1, wherein all of the sheets in the stack comprise unidirectional fibres.

7. A support of claim 1, including a mid-layer of composite material between two sheets of the stack of sheets.

8. A support of claim 7, wherein the mid-layer comprises non-aligned lengths of fibres in a matrix material.

9. A support of claim 1, wherein the fibres of each sheet are orientated at a different angle to the longitudinal axis of the body to the fibres in an adjacent sheet.

10. A support of claim 1, wherein the body of the support defines a substantially frusto-conical inwardly facing surface which is coaxial with the longitudinal axis of the body.

11. A support of claim 10, wherein the inwardly facing surface defines an angle with respect to a plane perpendicular to the longitudinal axis of the support which is in the range 17 to 26°.

12. A support of claim 1, wherein the fibres of the sheets comprise at least one of carbon fibres, E-glass fibres, S-glass fibres, basalt rock fibres and boron nitride fibres.

13. A flywheel assembly comprising a support of claim 10, and a rotor mounted on the support, wherein the frusto-conical inwardly facing surface defines an angle with respect to the longitudinal axis of the body which is selected such that the support is strain matched with the rotor.

14. A method of manufacturing a rotor support for coupling an annular flywheel rotor to a shaft for rotation with the shaft, the support comprising a body having a longitudinal axis about which it rotates in the finished flywheel assembly, comprising the steps of:
    forming a stack of sheets of a composite material including fibres, the stack including at least two unidirectional sheets, each having substantially all of their fibres extending in the same direction,
    overlaying the sheets such that the fibres of one of the unidirectional sheets are orientated at a different angle to the longitudinal axis of the body to the fibres in another unidirectional sheet, and
    applying at least one side layer of woven fabric over a side face of the stack of sheets,
    wherein the at least one side layer extends at least partway over an outer circumferential edge surface of the stack of sheets to resist delamination of the stack.

15. A method of claim 14, including applying at least one peripheral layer of woven fabric which extends over the outer circumferential surface of the stack of sheets.

16. A method of claim 15, wherein the at least one peripheral layer overlaps the side layer.

17. A method of claim 14, wherein the woven fabric comprises at least one of carbon fibres, E-glass fibres, S-glass fibres, basalt rock fibres and boron nitride fibres.

18. A method of claim 14, wherein sheets are overlaid such that the angle between the fibres of the one unidirectional sheet and the fibres of the other unidirectional sheet is around 45°.

19. A method of claim 14, wherein all of the sheets in the stack are unidirectional sheets.

20. A method of claim 14, wherein the sheets are overlaid with the fibres of each sheet orientated at a different angle to the longitudinal axis of the body to the fibres in an adjacent sheet.

21. A method of claim 14, wherein the fibres of the sheets comprise at least one of carbon fibres, E-glass fibres, S-glass fibres, basalt rock fibres and boron nitride fibres.

22. A method of claim 14, including mounting the rotor support on a shaft, and machining the outer circumferential surface of the support to a predetermined profile whilst rotating the shaft.

* * * * *